United States Patent [19]

Morita

[11] Patent Number: 4,750,101

[45] Date of Patent: Jun. 7, 1988

[54] TRANSFORMER APPARATUS WITH RECTIFIER

[75] Inventor: Tatsuo Morita, Kanagawa, Japan

[73] Assignee: Obara Corporation, Tokyo, Japan

[21] Appl. No.: 30,199

[22] Filed: Mar. 24, 1987

[30] Foreign Application Priority Data

Nov. 14, 1986 [JP] Japan .............................. 61-174019

[51] Int. Cl.[4] .............................................. H02M 7/06

[52] U.S. Cl. .................................... 363/126; 363/141; 363/144

[58] Field of Search ............... 363/125, 126, 141, 144, 363/145; 336/65, 67

[56] References Cited

U.S. PATENT DOCUMENTS

| | | | |
|---|---|---|---|
| 3,235,783 | 2/1966 | Howard | 363/141 X |
| 3,665,287 | 5/1972 | Cross et al. | 363/145 |
| 3,826,967 | 7/1974 | Wilkinson et al. | 363/126 |
| 4,027,205 | 5/1977 | Frederick | 363/126 X |
| 4,460,956 | 7/1984 | Hamasaki | 363/125 X |

FOREIGN PATENT DOCUMENTS

| | | |
|---|---|---|
| 61-33622 | 1/1986 | Japan . |
| 61-33620 | 1/1986 | Japan . |
| 61-33621 | 1/1986 | Japan . |

*Primary Examiner*—Peter S. Wong

*Attorney, Agent, or Firm*—Flynn, Thiel, Boutell & Tanis

[57] ABSTRACT

A center-tapped transformer apparatus with rectifiers is adapted to permit first and second secondary electrode plates to be joined with a secondary coil on the fronts of both ends thereof, on the front of the electrode plates of the secondary coil an electrode plate connected to an output terminal, the other rectifier, and a frontal electrode plate electrically connected to the second secondary electrode plate via a connecting tool being arranged in order and bound to each other.

3 Claims, 2 Drawing Sheets

TRANSFORMER APPARATUS WITH RECTIFIER

BACKGROUND OF THE INVENTION

1. Field of the Invention:

The present invention relates to a transformer apparatus having rectifiers for use in a resistance welding machine, etc.

2. Description of the Prior Art:

Conventionally, there are known two apparatuses as shown in FIGS. 5 and 6 as an apparatus of the type described above. One is adapted, as shown in FIG. 5, to have rectifiers 23, 24 respectively provided on the front of secondary electrode plates 21, 22 each connected to both ends of a secondary coil 20 as well as a common output terminal plate provided on the front of the rectifiers (refer for example to Japanese Laid-Open Patent Publication No. 61-33622). The other is adapted, as shown in FIG. 6, to have rectifiers 33, 34 respectively provided interiorly of secondary electrode plates 31, 32 extending in parallel from both ends of a secondary coil 30 in the forward direction thereof as well as a common output terminal plate 35 provided interiorly of the rectifiers (refer for example to Japanese Laid-Open Patent Publication No. 61-33620).

In such a prior apparatus as shown in FIG. 5, a protrusion frontally projecting from the transformer can be reduced, but in welding in need of a large current the rectifier must have a greater diameter to result in disadvantageously the size L of the transformer apparatus made large when the secondary electrode plates 21 and 22 and the rectifiers 23 and 24 are disposed vertically and horizontally respectively, and thus the rectifiers are obliged to be protruded widthwise from the transformer and to permit the whole apparatus to be large-sized.

On the other hand, also in the prior apparatus of the type shown in FIG. 6, protrusion projecting widthwith from the transformer can be eliminated, but the respective electrodes are adapted to extend frontally from the transformer, and thus the apparatus is made longer as a whole.

SUMMARY OF THE INVENTION

In view of the drawbacks of the prior transformers, it is an object of the present invention to provide a transformer apparatus having rectifiers wherein secondary electrode plates and those rectifiers are prevented from protruding from the transformer widthwise as much as possible and from being made longer as a whole.

To achieve the above object, a center-tapped transformer with rectifiers according to the present invention includes on the front thereof, a transformer body 13; a secondary coil 1; first and second secondary electrode plates 3, 4 joined with the secondary coil 1 on the fronts of both ends of the secondary coil 1; rectifiers **5*a*, 5*b*, one 5*a* of the rectifiers 5*a*, 5*b* being disposed on the front of the first secondary electrode plates 3 of the secondary coil for rectifying an AC current from the first secondary electrode plate 3 of the secondary coil, an electrode plate 6 disposed on the front of the rectifier 5*a*; one 5*b* of the rectifiers 5*a*, 5*b* being disposed on the front of the electrode plate 6 for rectifying the AC current from the second secondary electrode plate 4; a frontal electrode plate 7 provided on the front of the rectifier 5*b*; the above respective members being clamped with bolts 9 via an insulation plate 11, a press plate 12, and a coutersunk spring 14**.

According to the transformer apparatus having rectifiers of the present invention described above, AC currents appearing on the respective first and secondary electrode plates 3, 4 provided on both the ends of the secondary coil 1 of the transformer are respectively rectified through the rectifiers **5*a* and 5*b*, collected onto the electrode plate 6** connected to the output terminal, and fed to a welding machine, for use as a welding current.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
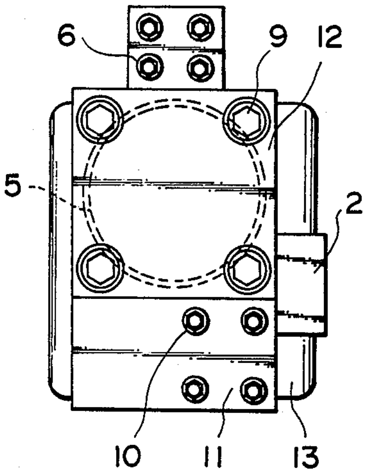
FIG. 1 is a frontal view of a transformer apparatus having rectifiers according to the present invention.
Figure 2:
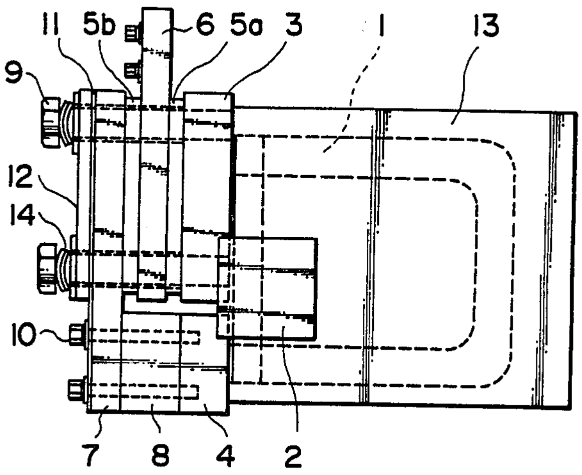
FIG. 2 is a side elevational view of FIG. 1.
Figure 3:
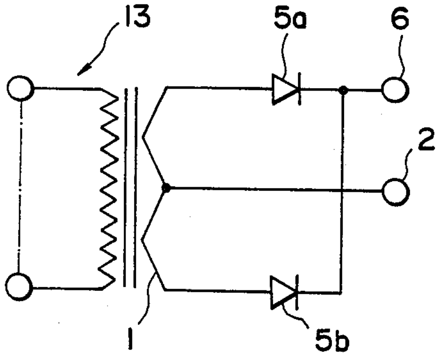
FIG. 3 is a circuit block diagram of FIG. 1.

Referring here to FIGS. 1 to 3, an embodiment of the transformer apparatus according to the present invention will be described.

In these figures, designated at 1 is a secondary coil disposed in a transformer body 13, on the fronts of both ends of which secondary coil copper-made first and secondary electrode plates 3, 4 are vertically disposed and connected thereto.

Designated at 2 is an output terminal bench connected to the neutral point of the secondary coil 1.

A rectifier **5*a* is disposed on the front of the first secondary electrode plate 3 directly connected to the front of one end of the secondary coil for rectifying an AC current from the above first secondary electrode plate 3, on the front of which rectifier 5*a* an electrode 6 connected to an output terminal is disposed, on the front of which electrode plate 6 a rectifier 5*b* is disposed for rectifying an AC current from the second secondary electrode plate 4, on the front of which rectifier 5*b* a frontal electrode plate 7** is disposed.

In addition, these members: first secondary electrode plate 3, rectifer **5*a*, electrode plate 6, rectifier 5*b*, and frontal electrode plate 7 are clamped with bolts 9 via an insulation plate 11, a press plate 12, and countersunk springs 14**, etc.

An electrically conductive spacer 8 is interposed between the second secondary electrode plate 4 directly connected to the front of the other end surface of the secondary coil and the frontal electrode plate 7, and the second secondary electrode plate 4, spacer 8, and electrode plate 7 are clamped with bolts 10.

Connected the electrode plates 4, 7 in such a manner via the spacer, disadvantageous positional relationship among the respective electrode plates produced by mistake upon manufacture thereof can be corrected with ease.

The current rectified to a DC current by the electrode plate 6 is fed to a welding machine, etc., to serve as a welding current, etc.

Figure 4:
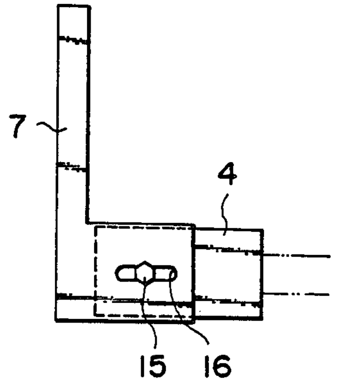
FIG. 4 is another embodiment of coupling means for coupling a frontal electrode plate and a secondary electrode plate.
Figure 5:
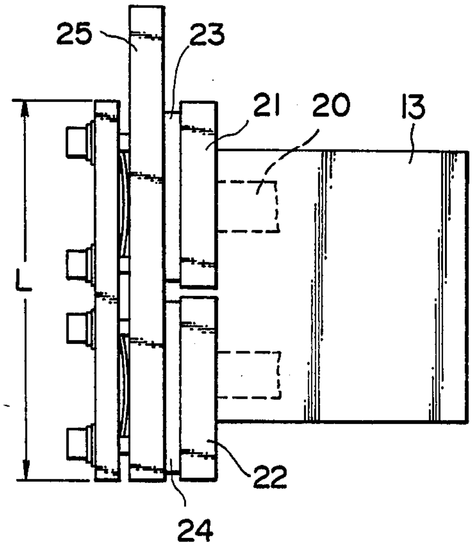
FIG. 5 (PRIOR ART)
FIG. 5 is a side elevational view of a prior transformer.
Figure 6:
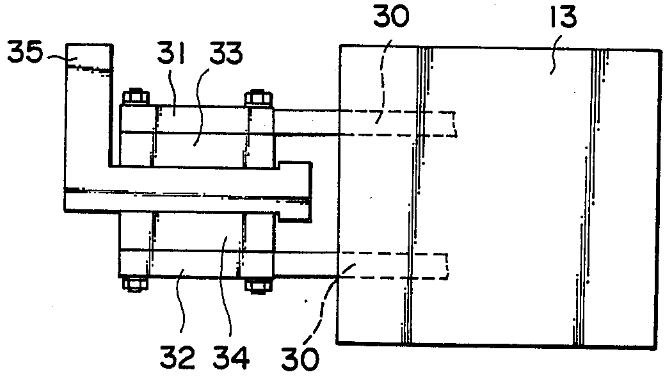
FIG. 6 (PRIOR ART)
FIG. 6 is a side elevational view of another prior transformer.

FIG. 4 illustrates another embodiment of a coupling means for coupling the second secondary electrode plate 4 and the frontal electrode plate 7.

In this case, the frontal electrode plate 7 is L-shaped, and the frontal electrode plate 7 and the second secondary electrode plate 4 are tightly bound with bolts 15 by bringing into contact the side surface of the lower side of the former frontal electrode plate 7 and the side surface of the second secondary electrode plate 4. Thereupon, with bolt holes each being formed into elongated ones 16, sufficient contact between the frontal electrode plate 7 and the second secondary electrode plate 4 can be assured together with the assurance of contact between the frontal electrode plate 7 and the other rectifier 5*b*.

According to the transformer apparatus having the rectifiers of the present invention, the above respective members are disposed on the front of the transformer in the order of: electrode plate, rectifier, electrode plate, rectifier, and frontal electrode plate. Accordingly, even if the respective rectifiers are large-sized to some degree, there is produced little possibility of these rectifiers being protruded from the transformer widthwise, and the entire length of the transformer apparatus is also reduced to make compact the apparatus on the whole.

Although a certain preferred embodiment has been shown and described, it should be understood that many changes and modifications may be made therein without departing from the scope of the appended claims.

What is claimed is:

1. A center-tapped transformer apparatus comprising:

(a) a transformer body;

(b) a secondary coil having first and second ends;

(c) first and second electrode plates disposed in front of and respectively joined with the first and second ends of said secondary coil;

(d) rectifiers, a first one of said rectifiers being disposed in front of the first electrode plate of said secondary coil for rectifying an AC current from said first electrode plate of said secondary coil;

(e) a third electrode plate disposed in front of said first rectifier, a second one of said rectifiers being disposed in the front of said third electrode plate for rectifying the AC current from the second electrode plate;

(f) a frontal electrode plate disposed in front of said second rectifier and electrically joined with said second electrode plate; and (g) pressing means including bolts and an associated insulation plate, press plate, and spring for clamping together said first electrode plate, first rectifier, third electrode plate, second rectifier and frontal electrode plate.

2. A center-tapped transformer apparatus according to claim 1, including an electrically conductive spacer interposed between said second electrode plate and said frontal electrode plate.

3. A center-tapped transformer apparatus according to claim 1, wherein said frontal electrode plate is Lshaped and connected to said second secondary electrode plate via bolts.

* * * * *